(No Model.)

R. HOLMES.
NUT LOCK.

No. 511,616.

Patented Dec. 26, 1893.

WITNESSES:
Wm P. Patton
C. Sedgwick

INVENTOR
R. Holmes
BY
Munn & Co
ATTORNEYS.

UNITED STATES PATENT OFFICE.

ROBERT HOLMES, OF CAÑON CITY, COLORADO, ASSIGNOR OF ONE-HALF TO JOHN HOLMES, OF OLD MISSION, MICHIGAN.

NUT-LOCK.

SPECIFICATION forming part of Letters Patent No. 511,616, dated December 26, 1893.

Application filed September 20, 1893. Serial No. 485,952. (No model.)

*To all whom it may concern:*

Be it known that I, ROBERT HOLMES, of Cañon City, in the county of Fremont and State of Colorado, have invented a new and useful Improvement in Nut-Locks, of which the following is a full, clear, and exact description.

My invention relates to improvements in nut locks, and more particularly to an improved device for locking the nuts on the spindles of wagon axles to prevent their accidental displacement; the objects being to provide a novel, simple and effective device of the type mentioned, which will be convenient in operation to secure or release the nut, and that will serve to retain a washer in loose contact with the true end of the spindle box, permitting the free rotation of the wheel hub within which said box is secured.

To these ends my invention consists in the construction and combination of parts, as is hereinafter described and claimed.

Reference is to be had to the accompanying drawings forming a part of this specification, in which similar letters of reference indicate corresponding parts in all the figures.

Figure 1:
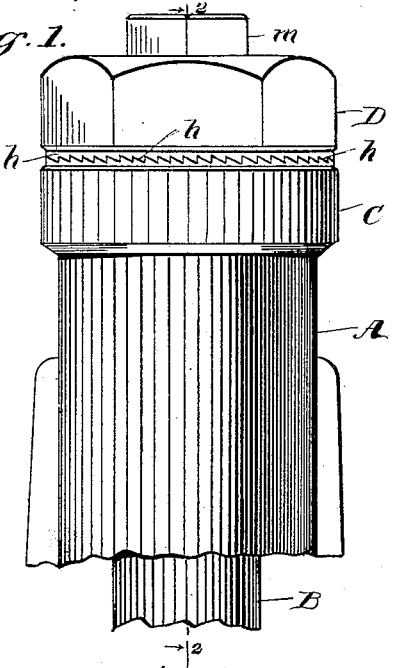
Figure 2:
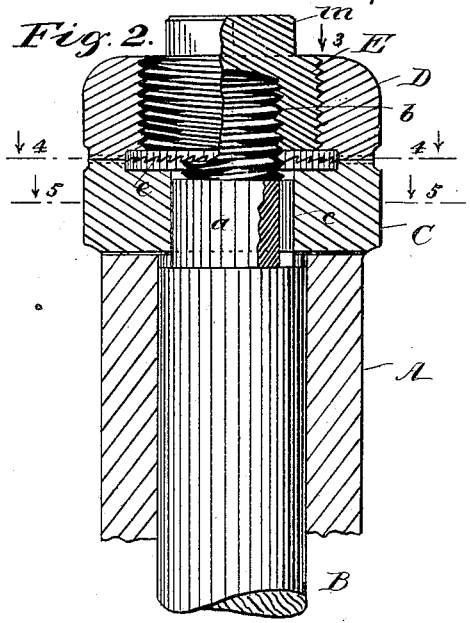
Figure 3:
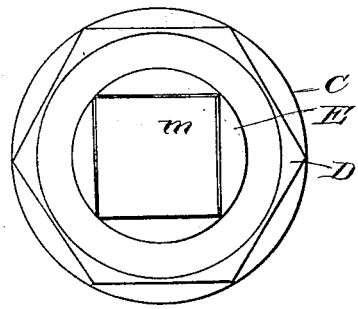
Figure 5:
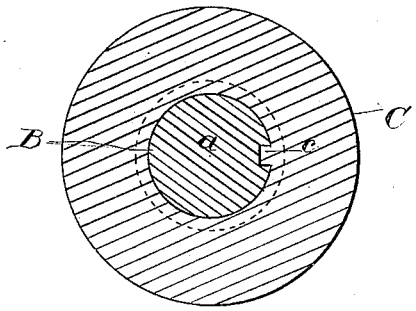
Figure 4:
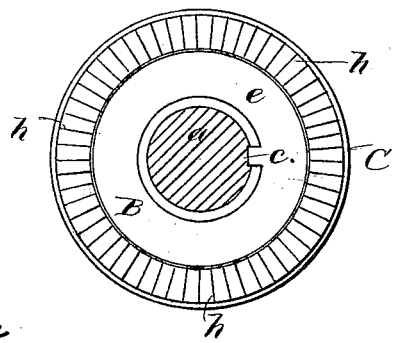

Figure 1 is a side view in part, of a spindle box and spindle, with the improvement thereon. Fig. 2 is a longitudinal partly sectional view mainly on the line 2—2 in Fig. 1. Fig. 3 is an end view of parts opposite the arrow 3 in Fig. 2. Fig. 4 is a transverse sectional view on the line 4—4 in Fig. 2; and Fig. 5 is a transverse sectional view on the line 5—5, in Fig. 2.

In the drawings A represents in part an axle box, of the usual form, and B an axle spindle fitted to rotate in said box when in complete form it is integrally projected from a vehicle axle. The outer end portion of the spindle B, is reduced in diameter a proper degree as at $a$, and has a thread cut on a part $b$ nearest the terminal, which threaded extremity is of less diameter than the portion $a$, as indicated in Fig. 2.

On the spindle portion $a$, the thick washer C, is loosely fitted, and from its bore a key $c$ is projected inwardly to have a sliding engagement with a longitudinally formed groove or key-way in the part $a$, whereby the thick washer is loosely secured upon the spindle B.

As represented in Figs. 2 and 4, the washer C fits truly upon the true end of box A, and the outer side of said washer is counter-bored concentric with the center bore, so as to produce a shallow recess $e$ having a flat bottom, and a circular margin, and as the washer is circular in contour there is a flat annular projection produced as a border for the counter-bored recess, which projection is radially serrated, affording a series of ratchet teeth $h$ of equal pitch and all inclining in the same direction circularly considered. A polygonal nut D, is provided that is internally threaded of an opposite pitch to the thread on the part $b$ of the spindle; as shown the spindle thread is right hand pitched, and therefore the thread in the nut D, is made left hand pitch. A sufficient diameter is given to the threaded aperture in the nut D, to adapt it to receive the externally threaded body of the locking nut E, that is threaded to fit within the polygonal nut. The end of the nut D, that in use is nearest to the washer C, is recessed in the same manner as said washer, radial ratchet teeth being formed in the annular projection thus produced which teeth are suitably pitched and shaped to interlock with the teeth on the washer when the nut D and washer are brought together and properly adjusted. The locking nut E is axially perforated from the end that in service is adjacent to the washer C, of a proper depth; preferably the nut is not completely apertured. The central hole in the locking nut E, is threaded to fit the thread on the end portion $b$ of the spindle B, the depth of the hole in the locking nut permitting it to be adjusted so as to locate its inner end near to the washer C. On the outer end of the locking nut E, a peripherally square projection $m$ is formed for the reception of a wrench that can be freely applied for the proper adjustment of the nut it engages.

In use, when the parts are to be secured upon the end of the axle spindle B, so as to retain the heavy washer C, in loose contact with the true end of the box A, the interior nut E, is first screwed in the nut D and screwed at once on the spindle end $b$, to cause its inner end to approach the washer C, that has been previously slid upon and interlocked with the end portion $a$ of the spindle, until the serrated end of the nut D is made to touch the teeth on the washer C. The two series of teeth are now oppositely arranged, so that by a slight longitudinal movement of the polygonal nut D, its teeth will be caused to fairly interlock with those on the washer, to effect which the nut D is held from rotation, and the nut E is partly rotated in a direction to screw on the spindle end b, which will project the nut D toward the washer C, and cause the two series of ratchet teeth to fully engage, thus locking the two nuts D and E at the proper point to retain the washer C in loose contact with the end of the box A. A release of the nut D is effected by a reversal of movement of the nut E. If desired, the key used to lock the washer from turning on the spindle end a may be replaced by an equivalent device, such as the flattening of a place on the cylindrical body of the spindle portion a, and shaping the hole in the washer to fit on the flattened portion of the spindle; or the spindle may be squared on the exterior of the part a, and the washer have a square hole in it to fit upon the spindle. Hence I do not desire to be restricted to the use of a key and key-way as shown.

Having thus described my invention, I claim as new and desire to secure by Letters Patent—

1. The combination with a spindle having a threaded end, and a washer loosely secured on the spindle behind the thread, of a polygonal nut threaded oppositely to the thread on the spindle, interlocking teeth on said nut and on the washer, and a locking nut fitting within the polygonal nut and upon the threaded end of the spindle, substantially as described.

2. The combination with an axle box, a spindle therein, reduced near its outer end, a slidable washer held from rotation on the spindle, the spindle having a right hand thread at its outer extremity, of a polygonal nut having an internal left hand thread, interlocking teeth on said nut and on the opposing face of the washer, and a locking nut externally threaded to fit within the polygonal nut and to engage with the threaded end of the spindle, substantially as described.

3. The combination with the axle box and the spindle therein, having a threaded end, of a thick washer loosely secured on the spindle, an outer nut having an internal thread of an opposite pitch to that of the spindle, circular series of interlocking serrations on said nut and on the washer, a locking nut threaded on its periphery to engage the outer nut, and adapted to screw upon the threaded end of the spindle, and a projection on the outer end of the locking nut shaped to receive a wrench, substantially as described.

ROBERT HOLMES.

Witnesses:
H. A. NICHOLS,
J. W. REDMAN.